United States Patent
Solosky et al.

(10) Patent No.: US 10,042,375 B2
(45) Date of Patent: Aug. 7, 2018

(54) UNIVERSAL OPTO-COUPLED VOLTAGE SYSTEM

(71) Applicant: Honeywell International Inc., Morris Plains, NJ (US)

(72) Inventors: Rick Solosky, Plymouth, MN (US); John Evers, Albany, MN (US)

(73) Assignee: Honeywell International Inc., Morris Plains, NJ (US)

( * ) Notice: Subject to any disclaimer, the term of this patent is extended or adjusted under 35 U.S.C. 154(b) by 395 days.

(21) Appl. No.: 14/869,845

(22) Filed: Sep. 29, 2015

(65) Prior Publication Data

US 2016/0098055 A1 Apr. 7, 2016

Related U.S. Application Data

(60) Provisional application No. 62/057,694, filed on Sep. 30, 2014.

(51) Int. Cl.
*H02H 7/00* (2006.01)
*G05F 3/08* (2006.01)
(Continued)

(52) U.S. Cl.
CPC ............. *G05F 3/08* (2013.01); *H02H 3/18* (2013.01); *H02H 9/041* (2013.01)

(58) Field of Classification Search
USPC ........................................................ 361/18
See application file for complete search history.

(56) References Cited

U.S. PATENT DOCUMENTS 3,355,650 A * 11/1967 Tolmie ................. H02H 9/041
  323/225
3,425,780 A 2/1969 Potts
(Continued)

FOREIGN PATENT DOCUMENTS

EP 0325356 7/1989
EP 0276937 7/1991
(Continued)

OTHER PUBLICATIONS

Benson et al., "Power Plant MOM (Multimedia Operation and Monitoring)," 9 pages, prior to Mar. 28, 2013.
(Continued)

*Primary Examiner* — Ronald W Leja
(74) *Attorney, Agent, or Firm* — Anthony Miologos

(57) ABSTRACT

A system for providing one or more voltages at predetermined magnitudes. The system may be supplied with power having a range of voltage magnitudes without affecting the predetermined magnitudes of the one or more voltages provided by the system and without a need to change circuitry of the system. The system may be connected, for example, from 28 VDC to 250 VAC without affecting the predetermined magnitudes of the output voltage or voltages. This system is protected from a mistaken power hook-up thought to be for 28 VDC but actually being connected to 250 VAC, which could be a disaster for a system not having the present circuitry. The system may be used for supplying power for opto-couplers in relay detection and other applications. The system may incorporate lightning and reverse polarity protection, reference and regulated voltages, an output driver, and input isolation circuitry.

15 Claims, 4 Drawing Sheets

(51) Int. Cl.
      H02H 3/18      (2006.01)
      H02H 9/04      (2006.01)

(56) References Cited

U.S. PATENT DOCUMENTS

| | | |
|---|---|---|
| 3,520,645 A | 7/1970 | Cotton et al. |
| 3,649,156 A | 3/1972 | Conner |
| 3,681,001 A | 8/1972 | Potts |
| 3,836,857 A | 9/1974 | Ikegami et al. |
| 3,909,816 A | 9/1975 | Teeters |
| 4,084,232 A * | 4/1978 | Woods .................. G05F 1/577 307/38 |
| 4,157,506 A | 6/1979 | Spencer |
| 4,221,557 A | 9/1980 | Jalics |
| 4,242,079 A | 12/1980 | Matthews |
| 4,269,589 A | 5/1981 | Matthews |
| 4,280,184 A | 7/1981 | Weiner et al. |
| 4,303,385 A | 12/1981 | Rudich, Jr. et al. |
| 4,370,557 A | 1/1983 | Axmark et al. |
| 4,450,499 A | 5/1984 | Sorelle |
| 4,457,692 A | 7/1984 | Erdman |
| 4,483,672 A | 11/1984 | Wallace et al. |
| 4,519,771 A | 5/1985 | Six et al. |
| 4,521,825 A | 6/1985 | Crawford |
| 4,527,247 A | 7/1985 | Kaiser et al. |
| 4,555,800 A | 11/1985 | Nishikawa et al. |
| 4,622,005 A | 11/1986 | Kuroda |
| 4,626,193 A | 12/1986 | Gann |
| 4,641,108 A | 2/1987 | Gill, Jr. |
| 4,655,705 A | 4/1987 | Shute et al. |
| 4,672,324 A | 6/1987 | van Kampen |
| 4,695,246 A | 9/1987 | Bellfuss et al. |
| 4,701,878 A | 10/1987 | Gunkel et al. |
| 4,709,155 A | 11/1987 | Yamaguchi et al. |
| 4,777,607 A | 10/1988 | Maury et al. |
| 4,830,601 A | 5/1989 | Dahlander et al. |
| 4,842,510 A | 6/1989 | Grunden et al. |
| 4,843,084 A | 6/1989 | Parker et al. |
| 4,872,828 A | 10/1989 | Mierzwinski et al. |
| 4,904,986 A | 2/1990 | Pinckaers |
| 4,949,355 A | 8/1990 | Dyke et al. |
| 4,955,806 A | 9/1990 | Grunden et al. |
| 5,026,270 A | 6/1991 | Adams et al. |
| 5,026,272 A | 6/1991 | Takahashi et al. |
| 5,037,291 A | 8/1991 | Clark |
| 5,073,769 A | 12/1991 | Kompelien |
| 5,077,550 A | 12/1991 | Cormier |
| 5,112,117 A | 5/1992 | Altmann et al. |
| 5,126,721 A | 6/1992 | Butcher et al. |
| 5,158,477 A | 10/1992 | Testa et al. |
| 5,175,439 A | 12/1992 | Harer et al. |
| 5,222,888 A | 6/1993 | Jones et al. |
| 5,236,328 A | 8/1993 | Tate et al. |
| 5,255,179 A | 10/1993 | Zekan et al. |
| 5,270,577 A * | 12/1993 | Yamaguchi .......... G05B 19/054 307/25 |
| 5,276,630 A | 1/1994 | Baldwin et al. |
| 5,280,802 A | 1/1994 | Comuzie, Jr. |
| 5,300,836 A | 4/1994 | Cha |
| 5,347,982 A | 9/1994 | Blazer et al. |
| 5,365,223 A | 11/1994 | Sigafus |
| 5,391,074 A | 2/1995 | Meeker |
| 5,424,554 A | 6/1995 | Marran et al. |
| 5,446,677 A | 8/1995 | Jensen et al. |
| 5,472,336 A | 12/1995 | Adams et al. |
| 5,506,569 A | 4/1996 | Rowlette |
| 5,567,143 A | 10/1996 | Servidio |
| 5,592,033 A * | 1/1997 | Gold .................... H03K 17/79 250/551 |
| 5,599,180 A | 2/1997 | Peters et al. |
| 5,682,329 A | 10/1997 | Seem et al. |
| 5,722,823 A | 3/1998 | Hodgkiss |
| 5,797,358 A | 8/1998 | Brandt et al. |
| 5,971,745 A | 10/1999 | Bassett et al. |
| 6,060,719 A | 5/2000 | DiTucci et al. |
| 6,071,114 A | 6/2000 | Cusack et al. |
| 6,084,518 A | 7/2000 | Jamieson |
| 6,172,432 B1 | 1/2001 | Schnackenberg et al. |
| 6,222,719 B1 | 4/2001 | Kadah |
| 6,261,086 B1 | 7/2001 | Fu |
| 6,299,433 B1 | 10/2001 | Gauba et al. |
| 6,346,712 B1 | 2/2002 | Popovic et al. |
| 6,349,156 B1 | 2/2002 | O'Brien et al. |
| 6,356,827 B1 | 3/2002 | Davis et al. |
| 6,381,503 B1 | 4/2002 | Dollhopf et al. |
| 6,385,510 B1 | 5/2002 | Hoog et al. |
| 6,457,692 B1 | 10/2002 | Gohl, Jr. |
| 6,474,979 B1 | 11/2002 | Rippelmeyer |
| 6,486,486 B1 | 11/2002 | Haupenthal |
| 6,509,838 B1 | 1/2003 | Payne et al. |
| 6,552,865 B2 | 4/2003 | Cyrusian |
| 6,676,404 B2 | 1/2004 | Lochschmied |
| 6,743,010 B2 | 6/2004 | Bridgeman et al. |
| 6,782,345 B1 | 8/2004 | Siegel et al. |
| 6,794,771 B2 | 9/2004 | Orloff |
| 6,912,671 B2 | 6/2005 | Christensen et al. |
| 6,917,888 B2 | 7/2005 | Logvinov et al. |
| 6,923,640 B2 | 8/2005 | Canon |
| 7,076,311 B2 | 7/2006 | Schuster |
| 7,088,137 B2 | 8/2006 | Behrendt et al. |
| 7,088,253 B2 | 8/2006 | Grow |
| 7,202,794 B2 | 4/2007 | Huseynov et al. |
| 7,241,135 B2 | 7/2007 | Munsterhuis et al. |
| 7,242,116 B2 | 7/2007 | Kawazu et al. |
| 7,255,285 B2 | 8/2007 | Troost et al. |
| 7,274,973 B2 | 9/2007 | Nichols et al. |
| 7,289,032 B2 | 10/2007 | Seguin et al. |
| 7,327,269 B2 | 2/2008 | Kiarostami |
| 7,617,691 B2 | 11/2009 | Street et al. |
| 7,728,736 B2 | 6/2010 | Leeland et al. |
| 7,764,182 B2 | 7/2010 | Chian et al. |
| 7,768,410 B2 | 8/2010 | Chian |
| 7,800,508 B2 | 9/2010 | Chian et al. |
| 8,085,521 B2 | 12/2011 | Chian |
| 8,299,559 B2 | 10/2012 | Nazarian |
| 8,390,324 B2 | 3/2013 | Fletcher et al. |
| 8,601,291 B2 | 12/2013 | Ewing et al. |
| 8,769,158 B2 | 7/2014 | Kretschmann et al. |
| 9,791,110 B2 * | 10/2017 | Hu ........................ F21K 9/23 |
| 2002/0099474 A1 | 7/2002 | Khesin |
| 2003/0143503 A1 | 7/2003 | Wild et al. |
| 2003/0222982 A1 | 12/2003 | Hamdan et al. |
| 2004/0209209 A1 | 10/2004 | Chodacki et al. |
| 2005/0086341 A1 | 4/2005 | Enga et al. |
| 2006/0257805 A1 | 11/2006 | Nordberg et al. |
| 2007/0159978 A1 | 7/2007 | Anglin et al. |
| 2007/0188971 A1 | 8/2007 | Chian et al. |
| 2009/0009344 A1 | 1/2009 | Chian |
| 2009/0056649 A1 | 3/2009 | MacKenzie |
| 2009/0136883 A1 | 5/2009 | Chian et al. |
| 2010/0013644 A1 | 1/2010 | McDonald et al. |
| 2010/0067260 A1 * | 3/2010 | Fitzgerald ............. H02M 1/32 363/21.01 |
| 2010/0265075 A1 | 10/2010 | Chian |
| 2011/0207064 A1 | 8/2011 | Salani et al. |
| 2013/0193879 A1 * | 8/2013 | Sadwick ............ H05B 33/0818 315/307 |
| 2015/0002068 A1 * | 1/2015 | Durham ............... H02M 7/539 318/503 |
| 2016/0091204 A1 | 3/2016 | Patton et al. |
| 2016/0091205 A1 | 3/2016 | Solosky et al. |
| 2016/0091903 A1 | 3/2016 | Patton et al. |
| 2016/0092388 A1 | 3/2016 | Sorenson et al. |
| 2016/0098055 A1 * | 4/2016 | Solosky ................ G05F 3/08 361/18 |
| 2016/0123624 A1 | 5/2016 | Solosky |

FOREIGN PATENT DOCUMENTS

| | | |
|---|---|---|
| EP | 0967440 | 12/1999 |
| EP | 1148298 | 10/2001 |
| EP | 2388960 | 12/2012 |
| WO | WO 91/02300 | 2/1991 |

(56) References Cited

FOREIGN PATENT DOCUMENTS

| WO | WO 97/18417 | 5/1997 |
|----|-------------|--------|
| WO | WO 2005/098954 | 10/2005 |
| WO | WO 2008/144308 | 11/2008 |

OTHER PUBLICATIONS

Buxton, "Totally Reconfigurable Analog Circuit, Concept and Practical Implementation," IEEE, pp. 292-295, 1999.

Description of "Smart Analog, Press Release," Renesas Electronics, 1 page, prior to Mar. 29, 2013. (Unable to obtain the actual press release, the description only is provided).

Fireye, "YB110/YB230 Fireye BurnerLogiX, Microprocessor-Based Integrated Burner Management Cotnrol," 62 pages, May 4, 2011.

Honeywell, "R7910A Sola HC (Hydronic Control), R7911 Sola SC (Steam Control), Product Data," 122 pages, Nov. 2009.

https://www.rensas.com/en-us/products/smart-analog/smart-analog-f . . . , "Smart Analog Features," Renesas Electronics, 4 pages, printed Jun. 28, 2016.

Huebner et al., "Real-Time LUT-Based Network Topologies for Dynamic and Partial FPGA Self-Reconfiguration," ACM, pp. 28-32, 2004.

Rockwell Automation Inc., "GuardLogix Integrated Safety System," 1 page, 2013.

Siemens Building Technologies, "Combustion Control Systems," 12 pages, Nov. 11, 2005.

Honeywell, "S4965 Series Combined Valve and Boiler Control Systems," 16 pages, prior to Jul. 3, 2007.

Honeywell, "SV9410/SV9420; SV9510/SV9520; SV9610/SV9620 SmartValve System Controls," Installation Instructions, 16 pages, 2003.

www.playhookey.com, "Series LC Circuits," 5 pages, printed Jun. 15, 2007.

\* cited by examiner

UNIVERSAL OPTO-COUPLED VOLTAGE SYSTEM

The present application claims the benefit of U.S. Provisional Patent Application No. 62/057,694, filed Sep. 30, 2014. U.S. Provisional Patent Application No. 62/057,694, filed Sep. 30, 2014, is hereby incorporated by reference.

BACKGROUND

The present disclosure pertains to power supplies and particularly to voltage sources.

SUMMARY

The disclosure reveals a system for providing one or more voltages at predetermined magnitudes. The system may be supplied with power having a range of voltage magnitudes without affecting the predetermined magnitudes of the one or more voltages provided by the system and without a need to change circuitry of the system. The system may be connected, for example, from 28 VDC to 250 VAC without affecting the predetermined magnitudes of the output voltage or voltages. This system is protected from a mistaken power hook-up thought to be for 28 VDC but actually being connected to 250 VAC, which could be a disaster for a system not having the present circuitry. The system may be used for supplying power for opto-couplers in relay detection and other applications. The system may incorporate lightning and reverse polarity protection, reference and regulated voltages, an output driver, and input isolation circuitry.

DESCRIPTION

Figure 1:
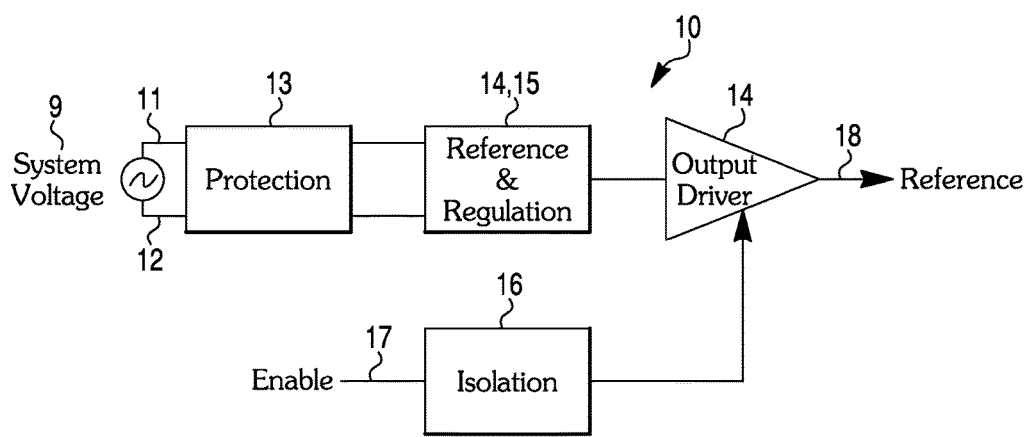
FIG. 1 is a diagram of an illustrative instance of a present system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Controller designs may have multiple versions of the control to be able to handle different levels of digital signal input voltages, in order to cover the range of voltages used in applications of the control for different needs and locales around the world. The controller's input circuits may have different values of electronics components to operate in systems that range from low to relative high voltages.

Controllers and voltage systems referred to herein may have application to components of heating, ventilation and air conditioning (HVAC) systems.

The need to interface for various voltage supply values may result in a proliferation of many versions of a controller and complicate inventory and selection for those who sell, purchase, and provide services for these systems. It may also complicate the work of an installer who can destroy a controller by accidentally choosing a version that is the wrong voltage for the system.

Additionally, a use of resistive voltage dividers to reduce high voltages down to the signal levels needed by control logic may result heat build-up and thermal stress generated by these circuits which can create issues in lower device ratings, increased costs due to more cooling equipment, and higher component failure rates.

The present system may consist of a universal opto-coupled input circuit that automatically adapts to any AC or DC input voltage in the nominal range from about 15 to 300 volts RMS DC and AC.

The circuit may be accomplished by using a bias generator circuit that uses line voltage levels to generate a proportional output voltage that is sent to each of the multiple opto-coupled input signal circuits. The voltage may bias input circuits to operate in the correct active range for the opto-couplers. Bias voltages and the design of the input circuits may automatically limit the opto-coupler input current to an appropriate value. The present approach may achieve without a need for different voltage dividers or input circuits. A single circuit with fixed values may work correctly over the entire line voltage range.

Additionally, the present bias circuit may incorporate an ability to turn on virtually all inputs just when an input measurement is actually occurring. In a microcomputer-based control, the inputs may be measured and actually needs to be active for only a small percentage of time. One example is a line voltage input scheme that takes three samples of the input status, separated by 1 millisecond, at the positive peak of each line cycle. This scheme requires the inputs to be active for only 2 to 3 milliseconds during each 16.6 millisecond period (60 Hz line voltage provides a 16.6 millisecond cycle time). So although a typical opto-coupled circuit could be active during the entire positive alternation, or 8.3 milliseconds, the approach would allow these to be on only during a time of less than 3 milliseconds. Taking sine wave effects into account, the present approach may decrease internal power dissipation by at least 50 percent.

The present approach does not necessarily need different circuits (and thus different products) for different line voltages. The approach may easily turn inputs on just when needed. The approach may be integrated with compatibility to multiple line voltages.

The electronics of the present system may be included in a controller that provides two terminals to connect the line voltage to the bias circuit (power and neutral). There may be one terminal for each line voltage input signal along with one common terminal, to connect it to a corresponding opto-coupled input.

FIG. 1 is a diagram of an illustrative instance of a present system 10 for providing a safe and consistent voltage output 18 for application of various circuits such as opto-couplers, by using a system voltage 39 that may be of various magnitudes, ranging from a few tens of volts to several hundred volts, without a need to change the circuitry of system 10. System voltage 39 may be provided via lines 11 and 12 to a protection circuit 13. An output from protection circuit 13 may go a reference and regulation circuit 14, 15. An output of circuit 14, 15 may go to an output driver 14. An isolation circuit 16 may have an input 17 for an enable signal. The enable signal, after going through an opto-coupler, may go to driver 14. A reference signal may be presented at an output 18 of driver 14.

Figure 2:
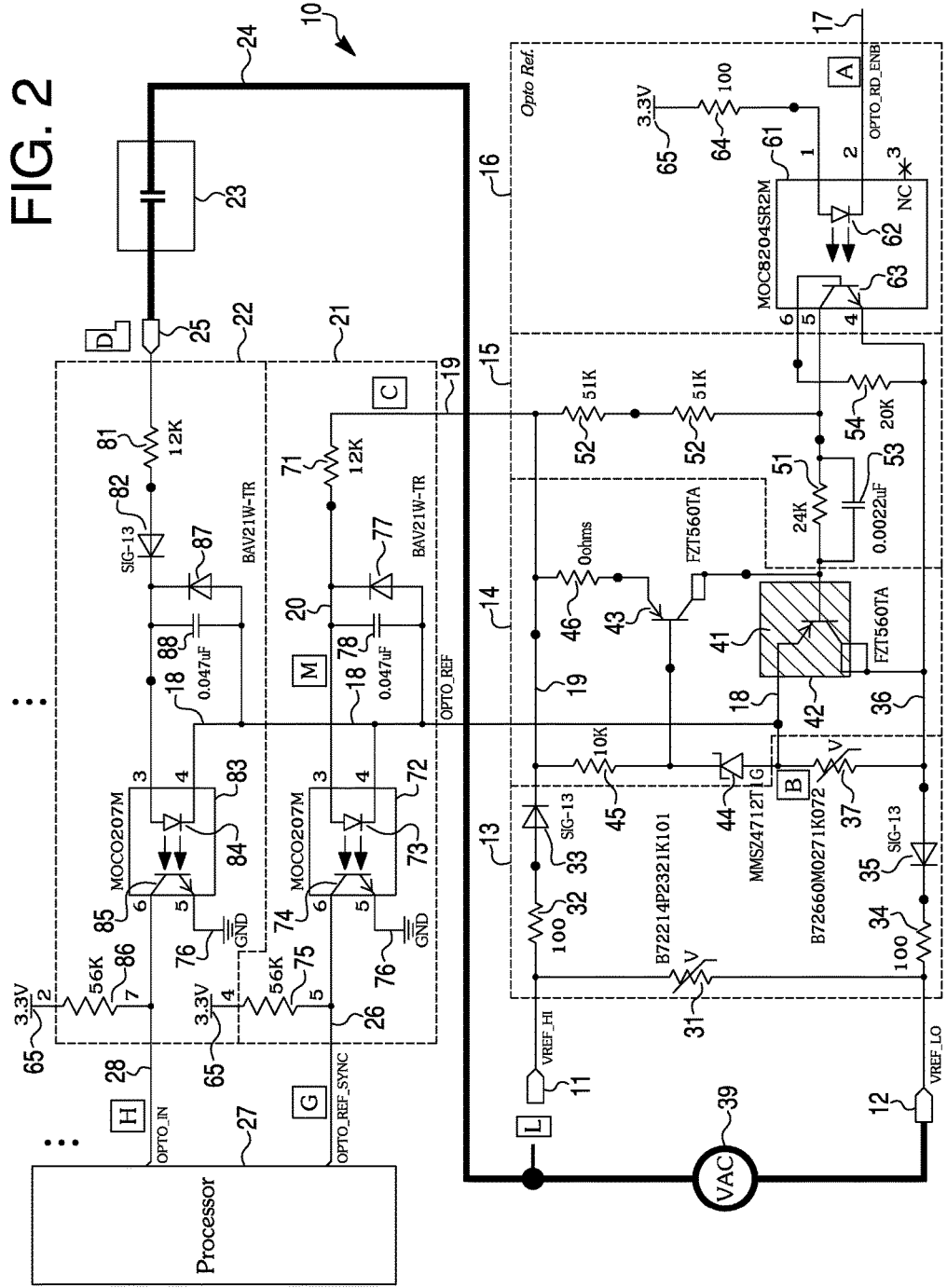
FIG. 2 is a diagram of an example circuit of the present opto-coupled voltage input mechanism or system.

FIG. 2 is a diagram of an example circuit of the present opto-coupled voltage input mechanism or system 10. System voltage 39 may be applied to lines or terminals 11 and 12 ranging from about 15 volts to 300 volts RMS DC or AC. A sub-circuit 13 for protection may be connected to terminals 11 and 12, and overlap and be connected with a regulator sub-circuit 14. Regulator sub-circuit 14 may be connected to a network sub-circuit 15. An isolation sub-circuit 16 may be connected to network 15. An enable signal 21 may be provided to an input 17 of isolation sub-circuit 16.

A connection 18 may go from regulation sub-circuit 14 to an opto circuit 21 and a connection 19 may go from sub-circuit 15 to opto circuit 22. Connection 18 may be a reference for opto circuits 21 and 22. Connection 19 may be an input for reference opto circuit 21.

Switch or relay contacts 23 associated with a switch mechanism may be monitored by opto circuit 22. A line 24 may provide a high reference voltage from terminal 11 to an input 25 of opto circuit 22. An output 26 with an opto reference sync from opto circuit 21 may go to a processor 27. An opto in signal 28 from opto circuit 22 may go to processor 27. Other opto circuits like opto circuit 22 may be present to monitor switch or relay contacts. These circuits, along with their corresponding contacts, may be connected to a reference provided by connection 18 and line 24, respectively, in like manner for opto circuit 22.

Sub-circuit 13 may have a varistor 31 (B72214P2321K101) connected across lines 11 and 12. A 100 ohm resistor 32 may have one end connected to line 11 and another end connected to an anode of a diode 33 (S1G-13). A cathode of diode 33 may be connected to line 19. A 100 ohm resistor 34 may have one end connected to line 12 and another end connected to a cathode of a diode 35 (S1G-13). An anode of diode 35 may be connected to a line 36. A varistor 37 (B72660M0271K072), may have one end connected to line 18 and another end connected to line 36. Varistors 31 and 37 and resistors 32 and 34 may provide protection against lightning and electro static interference. Diode 33 and 35 may provide reverse polarity protection. If system voltage 39 is conditioned, then varistors 31 and 37 and resistors 32 and 34 are not necessarily needed for lightning and electro static interference.

Sub-circuit 14 may have a PNP transistor 41 (FZT560TA) with an emitter connected to line 18, a collector connected to line 36, and having a base. Transistor 41 may be attached to a heat sink 42. A PNP transistor 43 (FZT560TA) may have a collector connected to the base of transistor 41. Transistor 43 may have an emitter and a base. A zener diode 44 (MMSZ471T1G) may have an anode connected to line 18 and a cathode connected to the base of transistor 43. A 10K ohm resistor 45 may have one end connected to line 19 and another end connected to the cathode of zener diode 44. The emitter of transistor 43 may be connected to line 19 directly or via a low ohm resistor 46.

Network sub-circuit 15 may have a 24K ohm resistor 51 with one end connected to the base of transistor 41 and having another end connected to a one end of a 102K ohm resistor. Another end of resistor 52 may be connected to line 19. A 0.0022 microfarad capacitor 53 may be connected in parallel with resistor 51. A 20K ohm resistor 54 may have one end connected to line 36 and have another end.

Isolation sub-circuit 16 may have an opto coupler 61 (MOC8204SR2M) with a light emitting diode 62 and a light sensitive photo NPN transistor 63. An anode of transistor 62 may be connected to one end of a 100 ohm resistor 64. Another end of resistor 64 may be connected to a plus 33 volt supply terminal 65. A cathode of diode 62 may be connected to input 17. Transistor 63 may have a base connected to another end of resistor 54, and an emitter connected to line 36. A collector of transistor 63 may be connected to the end of resistor 51 not connected to the base of transistor 41.

If an enable signal is applied to input 17, transistor 43 may turn on. As a result, transistor 41 may turn off. Capacitor 53 may improve the turnoff speed of transistor 41.

Opto circuit 21 may have a 12K ohm resistor 71 with one end connected to line 19 and another end connected via line 20 to an opto coupler 72 (MOCD207M) having a light emitting diode 73 with an anode connected to the other end of resistor 71 and a cathode connected to line 18. Opto coupler 72 may also have a light sensitive photo NPN transistor 74 with a collector connected to line 26 and an emitter connected to a ground 76. The collector of transistor 74 may also be connected to one end of a 56K ohm resistor 75. Another end of resistor 75 may be connected to a plus 3.3 volt supply terminal 65. A diode 77 (BAV21W) may have a cathode connected to the other end of resistor 71 and an anode connected to line 18. Diode 77 may provide reverse polarity protection. A 0.047 microfarad capacitor 78 may be connected in parallel with diode 77.

Opto circuit 22 may have a 12K ohm resistor 81 with one end connected to terminal or line 25 and another end connected to an anode of a diode 82 (S1G-13). A cathode of diode 82 may be connected to an anode of a light emitting diode 84 of an opto coupler 83. A cathode of diode 84 may be connected to line 18. Opto coupler 83 may also have a light sensitive photo NPN transistor 85 with a collector connected to line 28 and an emitter connected to ground 76. The collector of transistor 85 may also be connected to one end of a 56K ohm resistor 86. Another end of resistor 86 may be connected to plus 3.3 volt supply terminal 65. A diode of 87 (BAV21W) may have a cathode connected to the cathode of diode 82 and an anode connected to line 18. Diode 87 may provide reverse polarity protection. A 0.047 microfarad capacitor 88 may be connected in parallel with diode 87.

Figure 3:
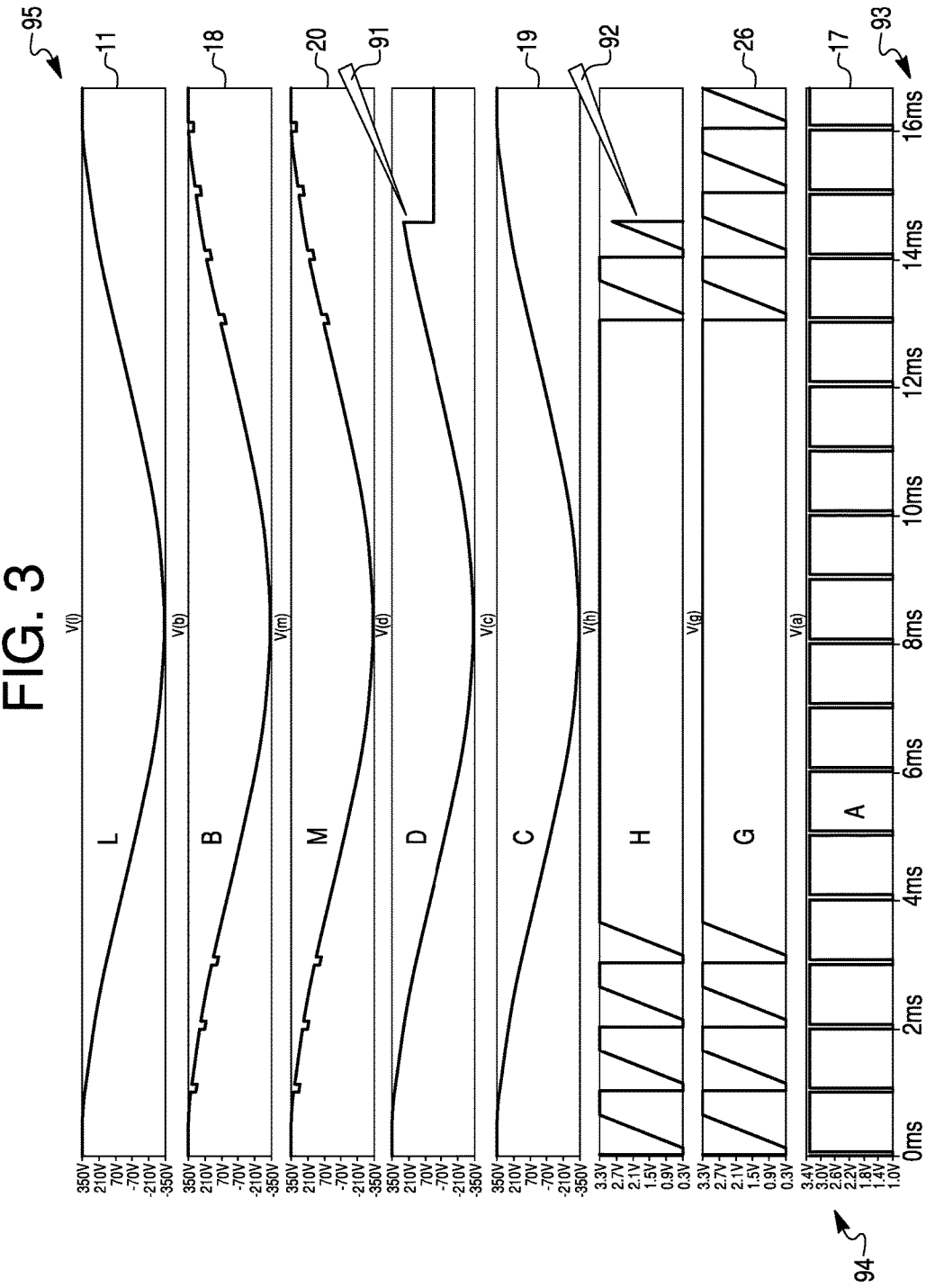
FIG. 3 is diagram of a graph 95 showing some waveforms from system.

FIG. 3 is diagram of a graph 95 showing some waveforms from system 10 and some of the opto-couplers 72 and 83 having outputs 26 and 27, respectively, to processor 27, while system 10 is operating. Signal L may be detected on terminal or line 11. Signal B may be detected on line 18. Signal M may be detected on line 20 of opto-coupler circuit 21. Signal D may be detected on terminal 25 at contacts 23 and an input of opto-coupler 22. The abrupt down movement of a waveform portion 91 of signal D may reveal an opening of switch or relay as indicated by contacts 23. Signal C may be detected on line 19 going to opto-coupler 21. Signal H may be detected on line 28 from opto-coupler 22 to processor 27. A waveform portion 92 of signal H may be low to indicate open contacts 23. Signal G may be detected on line 26 from an output of opto-coupler 21 to processor 27. Signal A may be provided on line 17 to opto-coupler 61 of isolation circuit 16.

Graph 95 may have a timeline at a bottom axis 93 that goes from about 0.00 milliseconds to 16.67 milliseconds that is a time period of one cycle of a 60 Hz AC power signal. A left axis 94 of graph may show a magnitude scale for each of the signals. Voltage scales for signals L, B, M, D and C may range from −350V to 350V. Voltage scales for signals H and G may range from 0.3V to 3.3V. The voltage scale for signal A may range from 1.0V to 3.4V.

Figure 4:
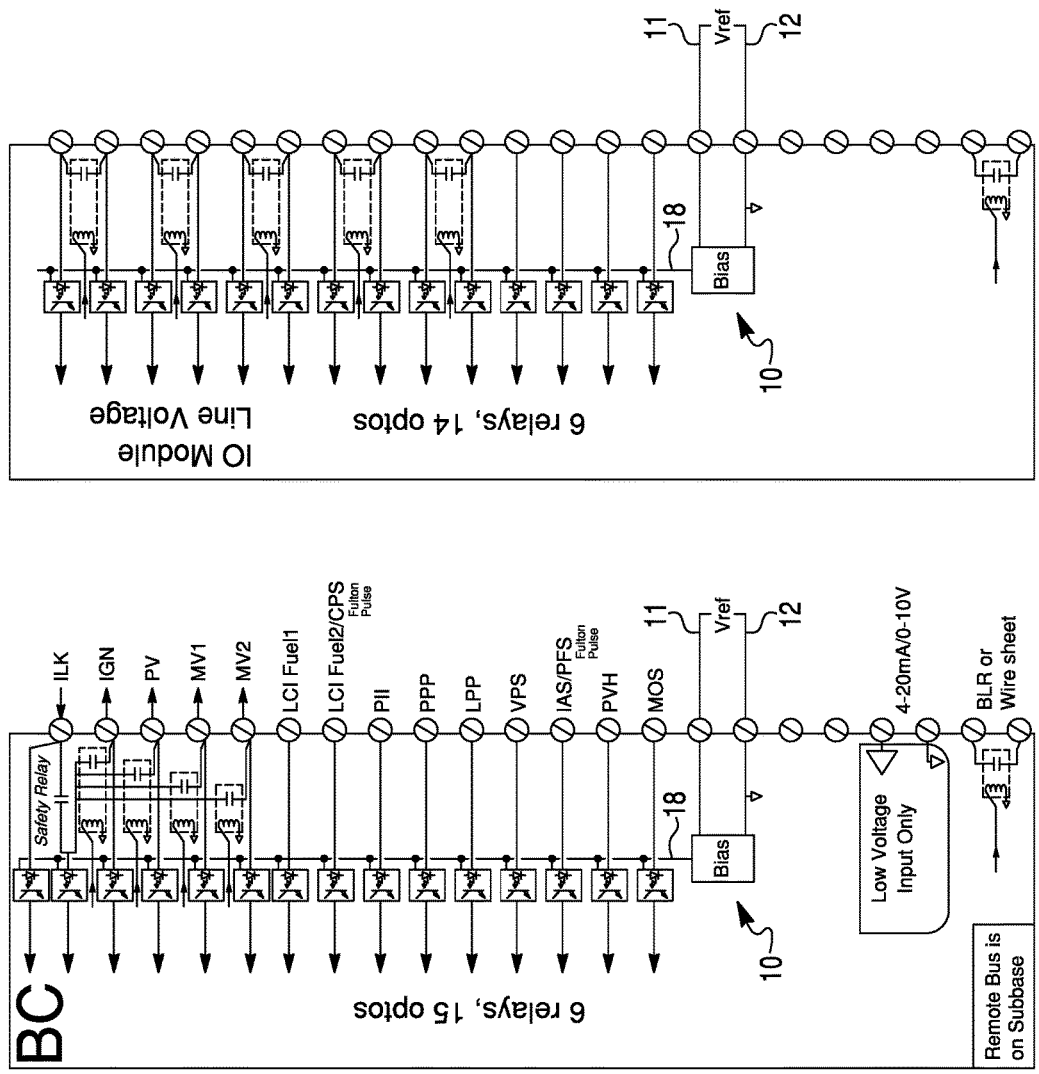
FIG. 4 is a diagram that shows a possible application of system for providing a bias on line to a number of opto-couplers for some devices.

FIG. 4 is a diagram that shows a possible application of system 10 for providing a bias on line 18 to a number of opto-couplers for a burner control (BC) and for an IO module line voltage mechanism. A system voltage (Vref) may be provided to system 10 on lines 11 and 12.

To recap, a voltage circuit system may incorporate input terminals for connection to a first voltage, a regulator connected to the input terminals, an output driver connected to the regulator and for providing a second voltage, and an isolator connected to the output driver. The isolator may incorporate an opto-coupler. The first voltage may be of a power source. The second voltage may be a reference voltage. The first voltage may have a magnitude between one and twenty times greater than a magnitude of the second voltage without affecting the magnitude of the second voltage.

The system may further incorporate a protection circuit connected between the input terminals and the first voltage. The protection circuit may guard against harm from lightning and reverse polarity to the regulator, the output driver, and the isolator.

At least one of a set of contacts of a relay that provides a connection to an opto-coupler circuit may have a magnitude of the first voltage.

The first voltage may range from a nominal voltage of about 15 volts RMS to 300 volts RMS, DC or AC, without affecting the regulator, output driver, and isolator.

The protection circuit may be unneeded if a conditioned power source is connected to the input terminals in lieu of the first voltage and prevents effects caused by lightning and reverse polarity to the isolator, output driver, and isolator.

An opto-coupled voltage mechanism may incorporate a protection module, a reference and regulation module connected to the protection module, an output driver connected to the reference and regulation module, and an isolation module connected to the output driver. The protection module may have an input for a system voltage. The isolation module may have an input for an enable signal. The output driver may have an output for providing a reference voltage. The system voltage may vary from a first value up to at least an order of magnitude greater than the first value, while the reference voltage remains at a second value.

The isolation module may incorporate an opto-coupled circuit having the input for an enable signal and an output to the output driver.

The system voltage may be between 15 volts RMS to 300 volts RMS, AC or DC.

The mechanism may further incorporate a reference opto-circuit connected to the output of the output driver for a reference voltage and to an output of the protection module, and for providing an opto reference sync signal.

The mechanism may further incorporate a processor having an input connected to the reference opto-circuit for receiving the opto reference sync circuit signal.

The mechanism may further incorporate one or more switch detection opto-couplers. Each switch detection opto-coupler may have a first terminal connected to a first contact of a set of contacts, for a switch, having a second contact for connection to the system voltage. Each switch detection opto-coupler may have a second terminal connected to the output of the output driver for a reference voltage.

The one or more switch detection opto-couplers may be turned on for a predetermined percentage of the total time of a cycle of power to the mechanism.

Since the one or more switch detection opto-couplers may be active for predetermined percentage of time, power dissipation of the mechanism may be decreased by at least 50 percent.

An approach for adapting a circuit to a supply voltage of various magnitudes, may incorporate generating one or more output voltages having constant levels from various supply line voltage levels, and conveying the one or more output voltages to one or more opto-coupled signal circuits. The one or more output voltage may bias one or more opto-coupled signal circuits to operate in a correct active range, and limit current to the one or more opto-coupled signal circuits to a magnitude appropriately safe for the one or more opto-coupled signal circuits.

The approach may further incorporate turning on the one or more opto-coupled signal circuits when or only when an input measurement is occurring.

An input measurement via an opto-coupled signal circuit may need to be active for just a fraction of a contiguous amount of time of a cycle of a supply line voltage available for the input measurement.

The fraction may be equal to or less than fifty percent.

The various supply line voltage levels may range from 15 volts to 300 volts RMS, DC or AC.

Each output voltage may have a preselected constant magnitude.

Power dissipation by the one or more opto-coupled signal circuits may decreased up to fifty percent due to turning on the one or more opto-coupled signal circuits when or only when an input measurement is occurring.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A voltage circuit system comprising:
   input terminals for connection to a first voltage;
   a regulator connected to the input terminals;
   an output driver connected to the regulator and for providing a second voltage; and
   an isolator connected to the output driver; and
   wherein
   the isolator comprises an opto-coupler;
   the first voltage is of a power source;
   the second voltage is a reference voltage; and
   the first voltage can have a magnitude between one and twenty times greater than a magnitude of the second voltage without affecting the magnitude of the second voltage, and at least one of a set of contacts of a relay that provides a connection to an opto-coupler circuit that has a magnitude of the first voltage.

2. The system of claim 1, further comprising:
   a protection circuit connected between the input terminals and the first voltage; and
   wherein the protection circuit guards against harm from lightning and reverse polarity to the regulator, the output driver, and the isolator.

3. The system of claim 2, wherein requirement of the protection circuit is based on determination that a conditioned power source is connected to the input terminals in lieu of the first voltage and prevents effects caused by lightning and reverse polarity to the isolator, output driver, and isolator.

4. The system of claim 1, wherein the first voltage can range from a nominal voltage of about 15 volts RMS to 300 volts RMS, DC or AC.

5. An opto-coupled voltage mechanism comprising:
a protection module;
a reference and regulation module connected to the protection module;
an output driver connected to the reference and regulation module;
an isolation module connected to the output driver;
a reference opto-circuit connected to the output of the output driver for a reference voltage and to an output of the protection module for providing an opto reference sync signal; and
a processor having an input connected to the reference opto-circuit for receiving the opto reference sync signal,
wherein:
the protection module has an input for a system voltage;
the isolation module has an input for an enable signal;
the output driver has an output for providing a reference voltage; and
the system voltage can vary from a first value up to at least an order of magnitude greater than the first value, while the reference voltage remains at a second value.

6. The mechanism of claim 5, wherein the isolation module comprises an opto-coupled circuit having the input for an enable signal and an output to the output driver.

7. The mechanism of claim 6, wherein the system voltage can be between 15 volts RMS to 300 volts RMS, AC or DC.

8. The mechanism of claim 5, further comprising one or more switch detection opto-couplers wherein each switch detection opto-coupler has a first terminal connected to a first contact of a set of contacts, for a switch, having a second contact for connection to the system voltage, and each switch detection opto-coupler has a second terminal connected to the output of the output driver for a reference voltage.

9. The mechanism of claim 8, wherein the one or more switch detection opto-couplers are turned on for a predetermined percentage of the total time of a cycle of power to the mechanism.

10. The mechanism of claim 9, wherein since the one or more switch detection opto-couplers are active for predetermined percentage of time, power dissipation of the mechanism can be decreased by at least 50 percent.

11. A method for adapting a circuit to a supply voltage of various magnitudes, comprising:
generating one or more output voltages having constant levels from various supply line voltage levels;
conveying the one or more output voltages to one or more opto-coupled signal circuits;
turning on the one or more opto-coupled signal circuits when an input measurement is occurring; and
wherein the one or more output voltages bias one or more opto-coupled signal circuits to operate in a correct active range, and limit current to the one or more opto-coupled signal circuits to a magnitude appropriately safe for the one or more opto-coupled signal circuits, and
wherein an input measurement via an opto-coupled signal circuit needs to be active for just a fraction of a contiguous amount of time of a cycle of a supply line voltage available for the input measurement.

12. The method of claim 11, wherein the fraction is equal to or less than fifty percent.

13. The method of claim 12, wherein power dissipation by the one or more opto-coupled signal circuits is decreased up to fifty percent due to turning on the one or more opto-coupled signal circuits when an input measurement is occurring.

14. The method of claim 11, wherein the various supply line voltage levels range from 15 volts to 300 volts RMS, DC or AC.

15. The method of claim 14, wherein each output voltage has a preselected constant magnitude.

* * * * *